(12) United States Patent
Teichmann et al.

(10) Patent No.: US 8,659,186 B2
(45) Date of Patent: Feb. 25, 2014

(54) METHODS AND SYSTEMS FOR CONTROLLING A POWER CONVERSION SYSTEM

(75) Inventors: Ralph Teichmann, Niskayuna, NY (US); Kathleen Ann O'Brien, Niskayuna, NY (US); John Freer, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 12/981,093

(22) Filed: Dec. 29, 2010

(65) Prior Publication Data

US 2012/0065803 A1 Mar. 15, 2012

(51) Int. Cl.
*H02J 1/10* (2006.01)
(52) U.S. Cl.
USPC .................. 307/58; 307/102; 307/103
(58) Field of Classification Search
USPC .......................... 307/58, 102, 103
See application file for complete search history.

(56) References Cited

U.S. PATENT DOCUMENTS

| | | | |
|---|---|---|---|
| 6,915,219 B2 | 7/2005 | Premerlani | |
| 7,069,159 B2 | 6/2006 | Zima et al. | |
| 7,126,800 B2 | 10/2006 | Premerlani et al. | |
| 7,233,843 B2 | 6/2007 | Budhraja et al. | |
| 7,519,454 B2 | 4/2009 | Gardner et al. | |
| 7,689,323 B2 | 3/2010 | Mansingh et al. | |
| 7,737,677 B2 | 6/2010 | Sekiguchi et al. | |
| 7,787,995 B2 | 8/2010 | Chen | |
| 2003/0144864 A1* | 7/2003 | Mazzarella | 705/1 |
| 2006/0224336 A1 | 10/2006 | Petras et al. | |
| 2007/0206644 A1 | 9/2007 | Bertsch et al. | |
| 2009/0079267 A1* | 3/2009 | Korba et al. | 307/102 |
| 2010/0231045 A1* | 9/2010 | Collins et al. | 307/47 |

* cited by examiner

*Primary Examiner* — Robert L. Deberadinis
(74) *Attorney, Agent, or Firm* — James McGinness; Armstrong Teasdale LLP

(57) ABSTRACT

A power conversion system is described. The power conversion system includes a first power converter coupled to an electrical grid at a first point of interconnection (POI), a first processing device coupled to the first power converter and configured to control operation of the first power converter, and a first power measurement device coupled to the first processing device and configured to collect data associated with power output of the first power converter. The power conversion system also includes a first global positioning system (GPS) receiver coupled to the first processing device and configured to receive location information corresponding to a location of the first power converter and temporal information corresponding to a time at the location.

22 Claims, 4 Drawing Sheets

METHODS AND SYSTEMS FOR CONTROLLING A POWER CONVERSION SYSTEM

BACKGROUND OF THE INVENTION

The embodiments described herein relate generally to electric power generation, and more specifically to, methods and systems for managing power applied to an electrical grid.

Solar energy and wind energy have increasingly become attractive sources of energy and have been recognized as clean, renewable alternative forms of energy. Wind and solar power generation systems penetrate established utility grids at both the transmission and distribution level. The installations may be widely dispersed throughout the utility network and often require long feeder lines for successful integration within the utility network.

A distributed power generation network includes a plurality of power generation systems each coupled to the electrical grid at different locations. For example, a conventional steam power generation plant may be connected to the grid at a first point of interconnection (POI), a wind farm may be connected to the grid at a second POI, and a solar power generation system may be connected to the grid at a third POI. Electricity applied to the electrical grid is required to meet grid connectivity expectations. These requirements address safety issues, grid stability issues, transmission loss management, as well as power quality concerns. For example, a grid connectivity expectation is that the generated power be conditioned to ensure that the power matches the voltage and frequency of the electricity flowing through the grid. Typically, power generation systems are controlled separately, each reacting to grid conditions.

BRIEF DESCRIPTION OF THE INVENTION

In one aspect, a power conversion system is provided. The power conversion system includes a first power converter coupled to an electrical grid at a first point of interconnection (POI), a first processing device coupled to the first power converter and configured to control operation of the first power converter, and a first power measurement device coupled to the first processing device and configured to collect data associated with power output of the first power converter. The power conversion system also includes a first global positioning system (GPS) receiver coupled to the first processing device and configured to receive location information corresponding to a location of the first power converter and temporal information corresponding to a time at the location.

In another aspect, a method for managing a distributed network of power conversion systems that includes a first power conversion system and a second power conversion system is provided. The first power conversion system includes a first power converter coupled at a first point of interconnection (POI) to an electrical grid and the second power conversion system includes a second power converter coupled at a second POI to the electrical grid. The method includes receiving, at a central processing device, a first power signal and a first location signal from the first power converter, receiving a second power signal and a second location signal from the second power converter, and controlling operation of at least one device included within the distributed network based at least partially on the first power signal, the first location signal, the second power signal, and the second location signal.

DETAILED DESCRIPTION OF THE INVENTION

The methods and systems described herein facilitate managing a distributed utility network that includes at least one of a power conversion system and a load coupled through a power converter. The power converter provides location information, power information, timing information, and phase angle information. For example, the power converter may include a global positioning system (GPS) receiver configured to receive location information and temporal information. The location information and temporal information may be used in conjunction with power and phase angle information to determine operating parameters for the power converter that are based at least partially on a location of the power converter and/or a time of day at that location.

The location information and temporal information, along with power information corresponding to actual power output by the power converter, power available to be output by the power converter, voltage, current, and/or phase angle at the POI with the electrical grid may be transmitted to a central processing device, which may be referred to herein as an Energy Management System (EMS). This information may be combined with information from other power conversion systems and voltage, current, phase angle, or other types of power information derived from other utility assets. This information may be used at a utility and/or regional operator level to monitor power balance, grid stability, and weather patterns and their effect on solar/wind power generation. The information may also be used as inputs to forecasting tools. Furthermore, the central processing device may determine operating instructions for the power conversion systems based at least partially on the information received.

Technical effects of the methods and systems described herein include at least one of: (a) receiving a first power signal and a first location signal from a first power conversion system; (b) receiving a second power signal and a second location signal from a second power conversion system; and (c) controlling operation of at least one of the first power conversion system and the second power conversion system based at least partially on the first power signal, the first location signal, the second power signal, and the second location signal.

Figure 1:
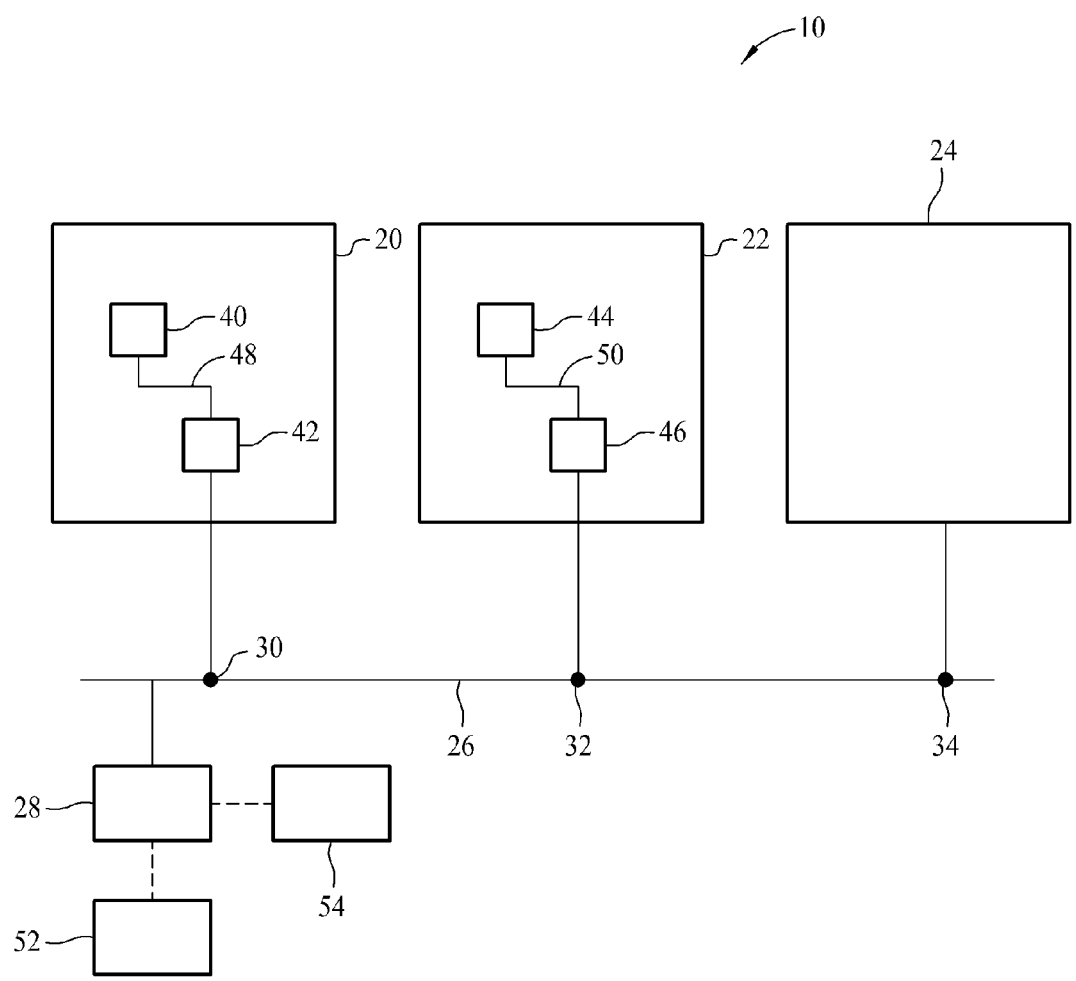
FIG. 1 is a block diagram of an exemplary embodiment of a distributed network of power conversion systems.

FIG. 1 is a block diagram of an exemplary distributed network 10 of power conversion systems. In the exemplary embodiment, distributed network 10 includes a first power conversion system 20, a second power conversion system 22, and a third power conversion system 24 that are each coupled to an electrical grid 26. Electrical grid 26 may include an electrical distribution grid, an electrical transmission grid, or any other type of electrical grid configured for delivering electricity. Furthermore, although described as including three power conversion systems, distributed network 10 may include any number of power conversion systems. In some embodiments, distributed network 10 also includes a central processing device 28. Central processing device 28 may also be referred to as a central Energy Management System (EMS) and is configured to provide grid level (i.e., utility level) control over network 10.

In the exemplary embodiment, distributed network 10 includes a plurality of power conversion systems each coupled to the electrical grid at different locations. For example, first power conversion system 20 is coupled to electrical grid 26 at a first point of interconnection (POI) 30, second power conversion system 22 is coupled to electrical grid 26 at a second POI 32, and third power conversion system 24 is coupled to electrical grid 26 at a third POI 34. Power conversion systems 20, 22, and 24 may be the same type of power conversion facility, or may be different types of power conversion facilities. Examples of power conversion systems include, but are not limited to, wind power generation systems, solar power generation systems, tidal power generation systems, battery power systems, and/or conventional power generation systems (e.g., coal burning power plants, nuclear power plants, and/or natural gas burning power plants). For example, third power conversion system 24 may be a conventional steam power generation plant while first power conversion system 20 and second power conversion system 22 are solar power generation facilities. The methods and systems described herein can be applied to any grid connected converter that links power conversion or transmission equipment to electrical grid 26. Examples include, but are not limited to, solar, wind, and tidal power generation equipment, as well as static VAR (volt-ampere reactive) compensation systems, flexible AC transmission systems, battery energy storage systems, and/or grid inverters.

In the exemplary embodiment, first power conversion system 20 includes a first collection apparatus 40 and a first converter 42. First converter 42 is also referred to herein as first power converter 42. Similarly, second power conversion system 22 includes a second collection apparatus 44 and a second converter 46. Second power converter 46 is also referred to herein as second power converter 46. Collection apparatus 40 and 44 each include at least one photovoltaic (PV) cell (not shown in FIG. 1), for example, at least one solar cell. Typically, a plurality of solar cells are coupled to form a solar module, and multiple solar modules are coupled to form a module string. The solar cells are arranged in this manner to increase the voltage and current generated. A first direct current (DC) voltage 48 is output by collection apparatus 40 and provided to converter 42. A second DC voltage 50 is output by collection apparatus 44 and provided to converter 46.

In the exemplary embodiment, EMS 28 receives information from first converter 42, from second converter 46, and from a sensor 52. Sensor 52 may include, but is not limited to including, a transformer thermal sensor, a line thermal sensor, and/or any other type of sensor that provides status information to EMS 28. Furthermore, in the exemplary embodiment, EMS 28 determines operating instructions for first converter 42, second converter 46, and other assets within distributed network 10. Other assets within distributed network 10 may include an intelligent electrical device (IED) 54, for example, but not limited to, a protective relaying device, a load tap changer controller, a circuit breaker controller, and/or a capacitor bank switch.

Figure 2:
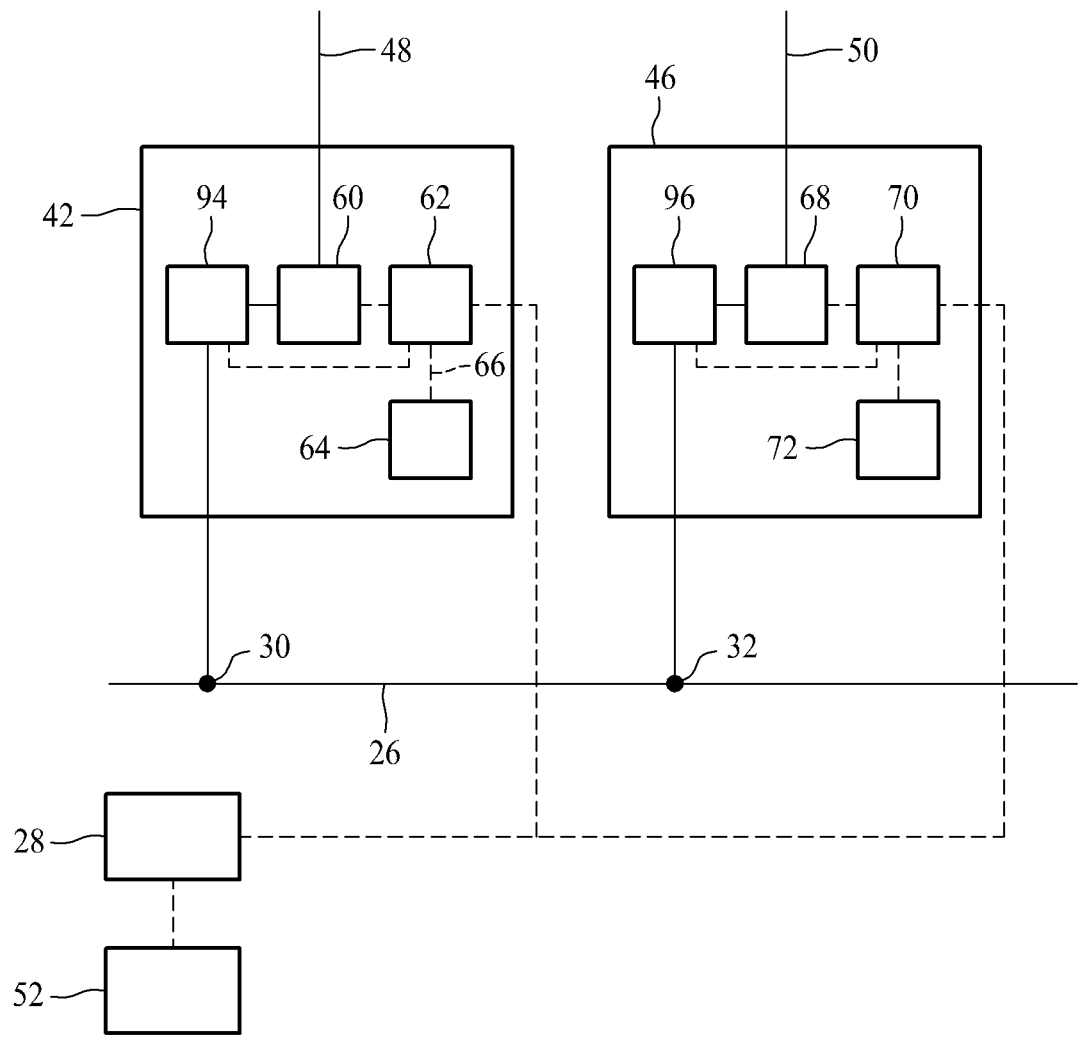
FIG. 2 is a block diagram of an exemplary embodiment of the first power converter and the second power converter shown in FIG. 1.

FIG. 2 is a block diagram of an exemplary embodiment of first power converter 42 (shown in FIG. 1) and second power converter 46 (shown in FIG. 1). First converter 42 is configured to condition DC voltage 48. In the exemplary embodiment, first converter 42 includes a first inverter 60, a first processing device 62, and a first global positioning system (GPS) receiver 64. For example, first converter 42 may include a DC/AC voltage inverter configured to convert DC voltage 48 to power ready for injecting onto electrical grid 26. First processing device 62 is configured to control operation of first inverter 60. First processing device 62 controls an electrical load that first inverter 60 presents to first collection apparatus 40 (shown in FIG. 1). Controlling the electrical load facilitates controlling power output by first converter 42. For example, maximum power point tracking (MPPT) may be utilized to present an optimal electrical load to first collection apparatus 40. The optimal electrical load matches an inductance of first collection apparatus 40 allowing first converter 42 to output a maximum power. The power point may also be adjusted to curtail first collection apparatus 40 (i.e., output less real power than is available). First collection apparatus 40 may be curtailed in order to reduce the power provided to electrical grid 26 in response to, for example, reduced energy demand.

In order to control operation of first inverter 60, first processing device 62 receives information from various sensors. For example, first processing device 62 may receive power information, including amplitudes of DC voltage and current output by first collection apparatus 40. First processing device 62 uses this information to control first inverter 60, including, but not limited to, performing MPPT. More specifically, power signals are provided to processing device 62. At least one signal is provided to processing device 62 that includes data used by processing device 62 to determine a power output of first collection apparatus 40. For example, a power meter (not shown in FIG. 2) may be included within first collection apparatus 40 and configured to provide a power signal to processing device 62 that is proportionate to power output of collection apparatus 40. Alternatively, a voltage sensor (not shown in FIG. 2) and a current sensor (not shown in FIG. 2) may be included within collection apparatus 40. The voltage sensor and current sensor measure a voltage and a current generated by collection apparatus 40, and provide signals to first processing device 62 that correspond to the measured voltage and current. Processing device 62 uses the measured voltage and current to determine power output of collection apparatus 40.

Furthermore, first GPS receiver 64 is configured to receive location information corresponding to a location of first inverter 60 and temporal information corresponding to a time at the location. First GPS receiver 64 provides a first GPS signal 66 to processing device 62. First GPS signal 66 includes the location information and the temporal information corresponding to the location of first inverter 60 and the time at that location. First GPS receiver 64 is coupled to, or included within, first inverter 60. This ensures that the location information and the temporal information received correspond to the location of first inverter 60. Temporal information may also be referred to herein as a "time-stamp." A time-stamp is collected, stored, and/or transmitted with a corresponding piece of information. For example, a time-stamp may stored with power information to record a time that the power information was collected. The time-stamp may also be transmitted, with the corresponding power information, to central processing device 28 for use by central processing device 28. More specifically, a time-stamp may be stored with a current measurement and a voltage measurement, and processing device 62 may store the time-stamp with a power determined from the current and voltage measurements. The power, and the time the power was measured, are then known. Determining the temporal information from a GPS signal facilitates obtaining coordinated time-stamps at distributed locations.

In the exemplary embodiment, second converter 46 is configured to condition DC voltage 50. In the exemplary embodiment, second converter 46 includes a second inverter 68, a second processing device 70, and a second GPS receiver 72. Components included within second converter 46 are substantially similar to components included within first converter 42.

Figure 3:
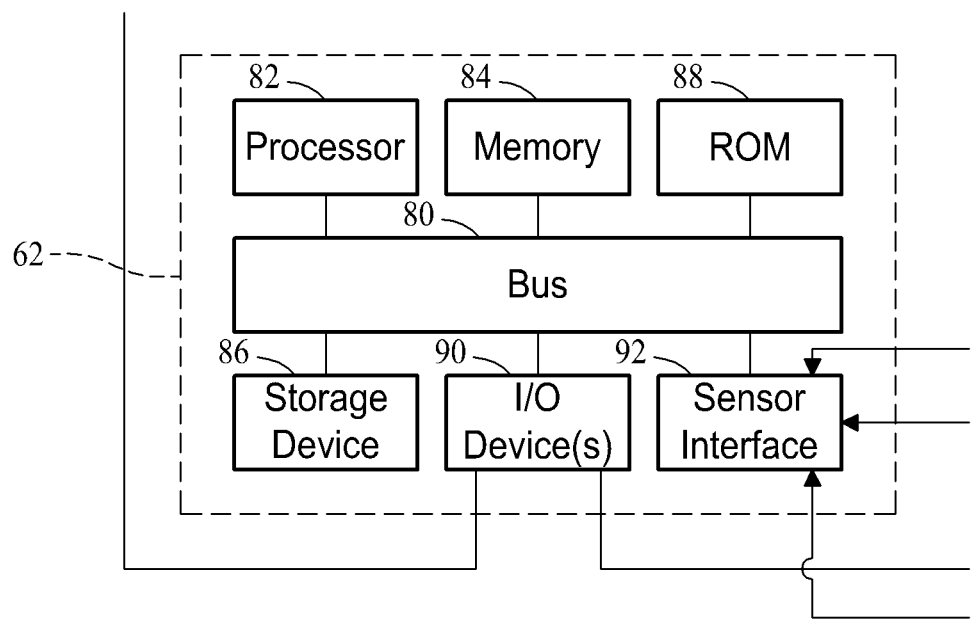
FIG. 3 is a block diagram of an exemplary embodiment of the processing device shown in FIG. 2.

FIG. 3 is a block diagram of an exemplary embodiment of processing device 62 (shown in FIG. 2). Processing device 62 may also be referred to as a system controller and/or a supervisory control and data acquisition (SCADA) system. In some embodiments, processing device 62 includes a bus 80 or other communications device to communicate information. One or more processor(s) 82 are coupled to bus 80 to process information, including information from sensors included in collection apparatus 40 (shown in FIG. 1). Processor(s) 82 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

Processing device 62 may also include one or more random access memories (RAM) 84 and/or other storage device(s) 86. RAM(s) 84 and storage device(s) 86 are coupled to bus 80 to store and transfer information and instructions to be executed by processor(s) 82. RAM(s) 84 (and/or storage device(s) 86, if included) can also be used to store temporary variables or other intermediate information during execution of instructions by processor(s) 82. Processing device 62 may also include one or more read only memories (ROM) 88 and/or other static storage devices coupled to bus 80 to store and provide static (i.e., non-changing) information and instructions to processor(s) 82. Processor(s) 82 process information transmitted from a plurality of electrical and electronic devices that may include, without limitation, a GPS receiver, an irradiance sensor, and a power meter. Instructions that are executed include, without limitation, resident conversion and/or comparator algorithms. The execution of sequences of instructions is not limited to any specific combination of hardware circuitry and software instructions.

Processing device 62 may also include, or may be coupled to, input/output device(s) 90. Input/output device(s) 90 may include any device known in the art to provide input data to processing device 62 and/or to provide output data to, for example, an EMS, a solar panel positioning device, and/or an inverter control system. Instructions may be provided to RAM 84 from storage device 86 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 90 may include, without limitation, computer peripherals associated with an operator interface (e.g., a human machine interface (HMI)) such as a mouse and a keyboard (neither shown in FIG. 3). Furthermore, in the exemplary embodiment, additional output channels may include, for example, an operator interface monitor and/or alarm device (neither shown in FIG. 3). Processing device 62 may also include a sensor interface 92 that allows processing device 62 to communicate with sensors. Sensor interface 92 may include one or more analog-to-digital converter that converts analog signals into digital signals that can be used by processor(s) 82.

In the exemplary embodiment, location dependent operating instructions and/or time dependent operating instructions are stored in ROM 88. GPS receiver 64 provides processing device 62 with GPS signal 66. Processing device 62 receives location information from GPS receiver 64, accesses the location dependent operating instructions stored in ROM 88, and generates an operating signal to control operation of inverter 60 based at least partially on the location of inverter 60. Furthermore, processing device 62 receives temporal information from GPS receiver 64, accesses the time dependent operating instructions stored in ROM 88, and generates an operating signal to control operation of inverter 60 based at least partially on the time at the location. The location information allows processing device 62 to determine where inverter 60 is located within electrical grid 26, for example, by accessing a stored grid map. The stored location dependent operating instructions may include instructions to curtail operation of inverter 60 after 5:00 p.m. until 6:00 a.m. This time period may correspond to a period of known low-power demand.

Converters 42 and 46 may also include phasor measurement units (PMU) configured to measure phasors at first POI 30 and second POI 32. More specifically, converter 42 may include a first PMU 94. Processing device 62 assembles a first synchronized phasor signal by assigning a time-stamp based on temporal information from GPS receiver 64 to a phasor measured by first PMU 94. Similarly, converter 46 may include a second PMU 96. Processing device 70 assembles a second synchronized phasor signal by assigning a time-stamp based on temporal information from second GPS receiver 72 to a phasor measured by second PMU 96.

Central processing device 28 (shown in FIG. 1) is communicatively coupled to first processing device 62 and second processing device 70. Central processing device 28 is configured to receive the first synchronized phasor signal and the second synchronized phasor signal from power conversion systems 22 and 24 and to generate an operating signal to control operation of at least one of inverter 60 and inverter 68 based at least partially on the first synchronized phasor signal and the second synchronized phasor signal. Furthermore, central processing device 28 may control other grid assets, for example, IED 54 (shown in FIG. 1) based at least partially on GPS signal 66 and/or received phasor signals. Controlling operation of multiple power conversion systems within network 10 based on information collected from each power conversion system within network 10 facilitates efficient operation of network 10 that exceeds the efficiency of a network having isolated power conversion systems using local information only to control their operation.

Furthermore, power conversion system 20 is configured to transmit a first curtailed power signal corresponding to power curtailed by first inverter 60 to central processing device 28. Second processing device 70 also transmits a second curtailed power signal corresponding to power curtailed by second inverter 96 to central processing device 28. For example, solar plants may be required to curtail at the request of utilities or system operators. They may also be required to provide information regarding the total amount of power available. For example, a utility may request that a 30 MW plant providing 20 MW curtail to provide only 15 MW. When the solar plant receives this command, it will curtail 5 MW, bringing the power output to the requested 15 MW. In the meantime, the weather may change and the solar plant may have an available power of 25 MW, meaning that the plant is now curtailing 10

MW in order to provide the requested 15 MW. The utility or power provider may benefit from knowing both the location and the amount of available power that can be provided should grid conditions change. This is done dynamically as changes can occur quickly. This additional functionality provides a utility operator with system-wide information about grid stability and grid conditions (e.g., faults, grid separation, etc).

Figure 4:
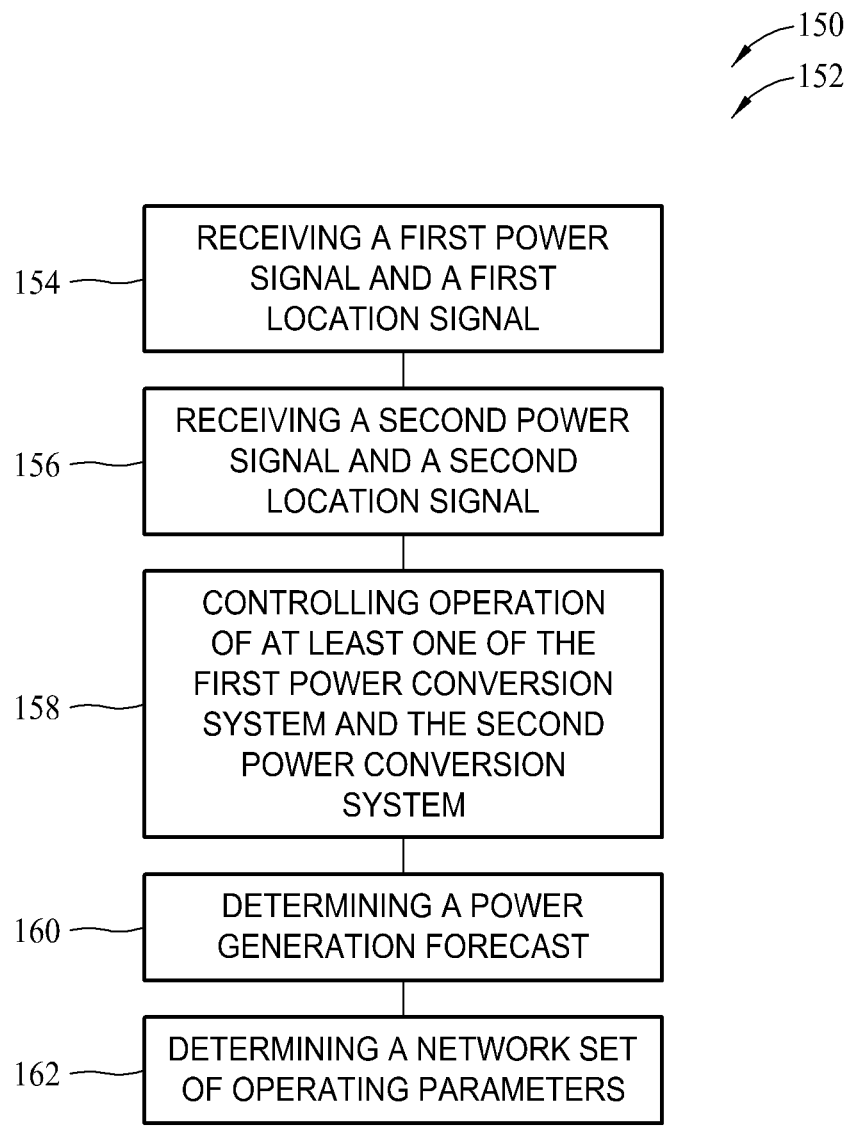
FIG. 4 is a flow chart of an exemplary method for managing the distributed network of power conversion systems shown in FIG. 1.

FIG. 4 is a flow chart 150 of an exemplary method 152 for managing a distributed network of power conversion systems, for example, network 10 (shown in FIG. 1). Distributed network 10 includes a first power conversion system, for example, first power conversion system 20 (shown in FIG. 1), and a second power conversion system, for example, second power conversion system 22. First power conversion system 20 includes first power converter 42 coupled at first POI 30 to electrical grid 26. Second power conversion system 22 includes second power converter 46 coupled at second POI 32 to electrical grid 26.

In the exemplary embodiment, method 152 includes receiving 154 a first power signal and a first location signal from first power conversion system 20. The first location signal includes, for example, a GPS generated location signal identifying the location of first inverter 60 and/or first power conversion system 20. The first location signal may be used in combination with a grid map stored for use by first processing device 62.

Receiving 154 the first power signal includes receiving a first actual power converted signal and a first potential output power signal. For example, the first power signal may include information corresponding to a potential output power of first inverter 60, an actual power output by first inverter 60, and/or a first power curtailed by first inverter 60. Method 152 also includes receiving 156 a second power signal and a second location signal from second power conversion system 22. Receiving 156 the second power signal includes receiving a second actual power converted signal and a second power conversion capacity signal. First processing device 62 collects information, for example, but not limited to, information regarding actual power produced by first power conversion system 20, power available at power conversion system 20, voltage, current, and/or phase angle at first POI 30. Similarly, second processing device 70 collects information, for example, but not limited to information regarding actual power produced by second power conversion system 22, power available at power conversion system 22, voltage, current, and/or phase angle at second POI 32. First processing device 62 and second processing device 70 transmit this information to a utility control system, for example, central processing device 28.

Receiving 154 and 156 may include receiving voltage and current measurements from a first PMU and a second PMU, for example, from first PMU 94 and second PMU 96, respectively. Receiving 154 a first location signal includes receiving a GPS generated location signal, for example GPS signal 66, indicative of the location of first power converter 42. Receiving 156 a second location signal includes receiving a GPS generated location signal indicative of the location of second power converter 46.

In other words, PMUs 94 and 96, or other similar devices used to measure currents and voltages accurately and with a time-stamp, are integrated within, or positioned near, a solar inverter or solar plant for the purpose of assisting in the management of grid stability. If a PMU is placed at first power conversion system 20 and second power conversion system 22, then the data (voltage, current, GPS time-stamp) can be used to participate in overall grid stability analyses at the distribution and transmission level.

The GPS time-stamp on the PMU can be used either in conjunction with the voltage and current measurements at the POI, with curtailed power data, or with other data to provide information on a network-wide basis regarding the behavior of a single solar plant, a group of solar plants, or the grid itself.

Method 152 also includes controlling 158 operation of at least one of first power converter 42 and second power converter 46 based at least partially on the first power signal, the first location signal, the second power signal, and the second location signal. Controlling 158 operation of at least one of first power converter 42 and second power converter 46 includes adjusting operation of at least one of first power converter 42 and the second power converter 46 to increase stability of electrical grid 26. Controlling 158 operation of at least one of first power converter 42 and second power converter 46 may also include coordinating operation of first power converter 42 and second power converter 46 to provide power balance in distributed network 10.

As described above, solar plants may be required to curtail at the request of utilities or system operators. They may also be required to provide information regarding the total amount of power available. The utility or power provider may benefit from knowing both the location and the amount of available power that can be provided should grid conditions change. This is done dynamically as changes can occur very quickly. This additional functionality provides a utility operator with system-wide information about grid stability and grid conditions (faults, grid separation, etc).

Method 152 may also include determining 160 a power generation forecast based at least partially on the first power signal, the first location signal, the second power signal, and the second location signal. Determining 160 a power generation forecast includes determining an effect of weather patterns on performance of distributed network 10, and more specifically, on each of power conversion systems 20, 22, and 24. Operating instructions stored in, for example, ROM 88 (shown in FIG. 3), may be edited so that operation of power conversion systems 22 and 24 are determined based at least partially on weather patterns effecting power conversion system 20. Similarly, operation of power conversion systems 20 and 24 are determined based at least partially on weather patterns effecting power conversion system 22.

Method 152 may also include determining 162 a network set of operating parameters to achieve a balance of power and stable transient management. An equivalent representing the first power conversion system and the second power conversion system as a single system with a statistically determinable fluctuating power output may also be determined Aggregate power production data associated with physical location of the generation assets will minimize the spinning reserve within a regulation zone, maximize utilization of power generation assets, and minimize risk of a network stability failure. As power generation fluctuates at a specific location within the regulation zone (i.e., peak power generation is sweeping through the regulation zone along with cloud movements), network management equipment can be appropriately prepared and brought online to ensure power quality and stability.

The communications allowing the exchange of information with the utility and/or system operator on a grid-wide basis may reduce the operating margin and therefore reduce energy costs. The communications provide a solar inverter, for example, inverter 60, a way to integrate with and play a part in a "smart-grid." It may avoid the need for additional phasor measurement and transmission equipment.

Furthermore, one or more computer-readable media having computer-executable components, may be configured for capturing power conversion information and location information, and for aggregating information captured from multiple locations. The computer-executable components may include: an interface component that, when executed by at least one processor, causes the at least one processor to receive a first power/location signal and a second power/location signal; a memory component that, when executed by at least one processor, causes the at least one processor to store at least one algorithm for determining operating commands for the first power converter and the second power converter; and an analysis component that, when executed by at least one processor, causes the at least one processor to generate operating signals that control operation of the first power converter and the second power converter.

The embodiments described herein embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The methods and systems described herein facilitate capturing and transmitting location information of a power converter. The location information is combined with data representing power conversion capacity and actual power converted, and is transmitted to a supervisory system. The supervisory system aggregates data from multiple power converters, or data from at least one power converter and data from at least one other grid asset that provides time-stamped voltage, power, and/or phase angle information, combines that intelligence with a grid map, and uses the information to manage instantaneous power balance and stability for an electrical grid.

The methods and systems described herein facilitate managing a distributed network of power generation and transmission systems that include at least one power converter and an EMS. The power converter may link a power generation system, a transmission control system, and/or a power utilization system to the electrical grid. The EMS may control other power generation, transmission, and utilization assets not connected to the electrical grid via a power converter, for example, an IED. The power converter is coupled at a first point of interconnection (POI) to an electrical grid. The EMS manages the power flow and grid stability for a specific regulation zone that also includes the first POI. The EMS uses various signals for the management of the electrical grid. The method includes receiving a first power signal, a first location signal, and phase angle information from the first power converter, receiving at least a second power signal, a second location signal, and phase angle information from another asset within the regulation zone, and controlling the operation of at least one of the power converter and the assets connected to the EMS based at least partially on any combination of the first power signal, the first location signal, the first phase angle information, the second power signal, the second location signal, and the second phase angle information.

Moreover, the methods and systems described herein facilitate managing a power generation system having limited control over the power source, for example, but not limited to, solar, wind or tidal power generation systems. Geographic location information and power production information are used to predict and control a power balance in a distributed utility network and a voltage profile in the regulation zone.

The above-described embodiments facilitate efficient and cost-effective operation of a distributed network of power conversion systems. The control system described herein controls operation of a plurality of distributed power converters based on information collected and aggregated at a central processing device.

Exemplary embodiments of a distributed network of power conversion systems are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system comprising:
   a first power converter coupled to an electrical grid at a first point of interconnection (POI);
   a first processing device coupled to the first power converter and configured to control operation of the first power converter;
   a first power measurement device coupled to the first processing device and configured to collect data associated with power output of the first power converter;
   a first global positioning system (GPS) receiver coupled to the first processing device and configured to receive location information corresponding to a location of the first power converter and temporal information corresponding to a time at the location; and,
   a central processing unit communicatively coupled to the first processing device, the first processing device configured to curtail operation of the first power converter to output a first A/C power and transmit to the central processing unit a first curtailed power signal.

2. A power conversion system in accordance with claim 1, further comprising a memory device coupled to the first processing device and configured to store at least one of location dependent operating instructions and time dependent operating instructions.

3. A power conversion system in accordance with claim 2, wherein the first processing device receives location information from the first GPS receiver, accesses the location dependent operating instructions stored in the memory device, and generates an operating signal to control operation of the first power converter based at least partially on the location of the first power converter.

4. A power conversion system in accordance with claim 2, wherein the first processing device receives temporal information from the first GPS receiver, accesses the time dependent operating instructions stored in the memory device, and generates an operating signal to control operation of the first power converter based at least partially on the time at the location.

5. A power conversion system in accordance with claim 1, wherein the first processing device is configured to control the first power converter by performing maximum power point tracking.

6. A power conversion system in accordance with claim 1, further comprising a central processing device communicatively coupled to the first processing device and to a second processing device associated with a second power conversion system, the second power conversion system comprising:
   a second power converter coupled to the electrical grid at a second POI;
   a second processing device coupled to the second power converter and configured to control operation of the second power converter;
   a second power measurement device coupled to the second processing device and configured to collect data associated with power output by the second power converter; and,
   a second GPS receiver coupled to the second processing device and configured to receive location information corresponding to a location of the second power converter and temporal information corresponding to a time at the location.

7. A power conversion system in accordance with claim 6, wherein the first power measurement device comprises a first phasor measurement unit (PMU) and the second power measurement device comprise a second PMU, the first PMU and the second PMU configured to measure a phasor at first POI and second POI, respectively.

8. A power conversion system in accordance with claim 7, wherein the first processing device assembles a first synchronized phasor signal by assigning a time-stamp based on temporal information from the first GPS receiver to a phasor measured by the first PMU and the second processing device assembles a second synchronized phasor signal by assigning a time-stamp based on temporal information from the second GPS receiver to a phasor measured by the second PMU.

9. A power conversion system in accordance with claim 8, wherein the central processing device is configured to receive the first synchronized phasor signal and the second synchronized phasor signal and to generate an operating signal to control operation of at least one of the first power converter and the second power converter based at least partially on the first synchronized phasor signal and the second synchronized phasor signal.

10. A power conversion system in accordance with claim 9, wherein the first processing device is further configured to:
   determine a potential output power corresponding to a power that could be output if the first power converter was not curtailed;
   determine a first curtailed power based on the first AC power and the potential output power; and,
   transmit, to the central processing device, the first curtailed power signal corresponding to the first curtailed power.

11. A power conversion system in accordance with claim 9, wherein the central processing device is configured to generate an operating signal to control operation of at least one of a circuit breaker, a tap changer, and a capacitor bank included within the electrical grid based at least partially on at least one of location information and temporal information provided by the GPS receiver.

12. A power conversion system in accordance with claim 1, further comprising a first collection apparatus coupled to the first power converter and wherein the first processing unit is configured to control an electrical load that the first power converter presents to the first collection apparatus.

13. A method for managing a distributed network of power conversion systems, the distributed network of power conversion systems including a first power conversion system and a second power conversion system, the first power conversion system including a first power converter coupled at a first point of interconnection (POI) to an electrical grid and the second power conversion system including a second power converter coupled at a second POI to the electrical grid, said method comprising:
   receiving, at a central processing device, a first power signal comprising at least one of a first actual power converted signal, a first potential output power signal and a first power curtailed signal and receiving, at the central processing device, a first location signal from the first power converter;
   receiving, at the central processing device, a second power signal and a second location signal from the second power converter; and,
   controlling operation of at least one device included within the distributed network based at least partially on the first power signal, the first location signal, the second power signal, and the second location signal.

14. A method in accordance with claim 13, wherein controlling operation of at least one device included within the distributed network comprises controlling operation of at least one of the first power converter, the second power converter, a circuit breaker, a tap changer, and a capacitor bank.

15. A method in accordance with claim 13, wherein receiving a second power signal includes receiving at least one of a second actual power converted signal, a second potential output power signal, and a second power conversion capacity signal.

16. A method in accordance with claim 13, wherein the first power converter includes a first phasor measurement unit (PMU) and the second power converter includes a second PMU, said method further comprising receiving voltage and current measurements from the first PMU and the second PMU.

17. A method in accordance with claim 13, wherein receiving a first location signal includes receiving a global positioning system (GPS) generated location signal indicative of the location of the first power converter, and wherein receiving a second location signal includes receiving a GPS generated location signal indicative of the location of the second power converter.

18. A method in accordance with claim 13, wherein controlling operation of at least one device included within the distributed network includes adjusting operation of at least one device included within the distributed network to increase stability of the electrical grid.

19. A method in accordance with claim 13, further comprising determining a power generation forecast based at least partially on the first power signal, the first location signal, the second power signal, and the second location signal, the power generation forecast at least partially based on an effect of weather patterns on performance of the distributed network.

20. A method in accordance with claim 13, wherein controlling operation of at least one device included within the distributed network includes coordinating operation of the first power converter and the second power converter to provide power balance in the distributed network.

21. A method in accordance with claim 13, further comprising determining a network equivalent representing the first power conversion system and the second power conversion system as a single system with a statistically determinable fluctuating power output.

22. A method in accordance with claim 13, further comprising receiving, at the least one device, information comprising at least one of an actual power produced by a first power conversion system, a potential power available at the first power conversion system, a voltage, a current, a phase angle at a first point of interconnection of the at least one device.

* * * * *